July 2, 1963 R. E. GOETZ 3,095,934
ROLLER BIT LUBRICATION
Filed Feb. 13, 1961
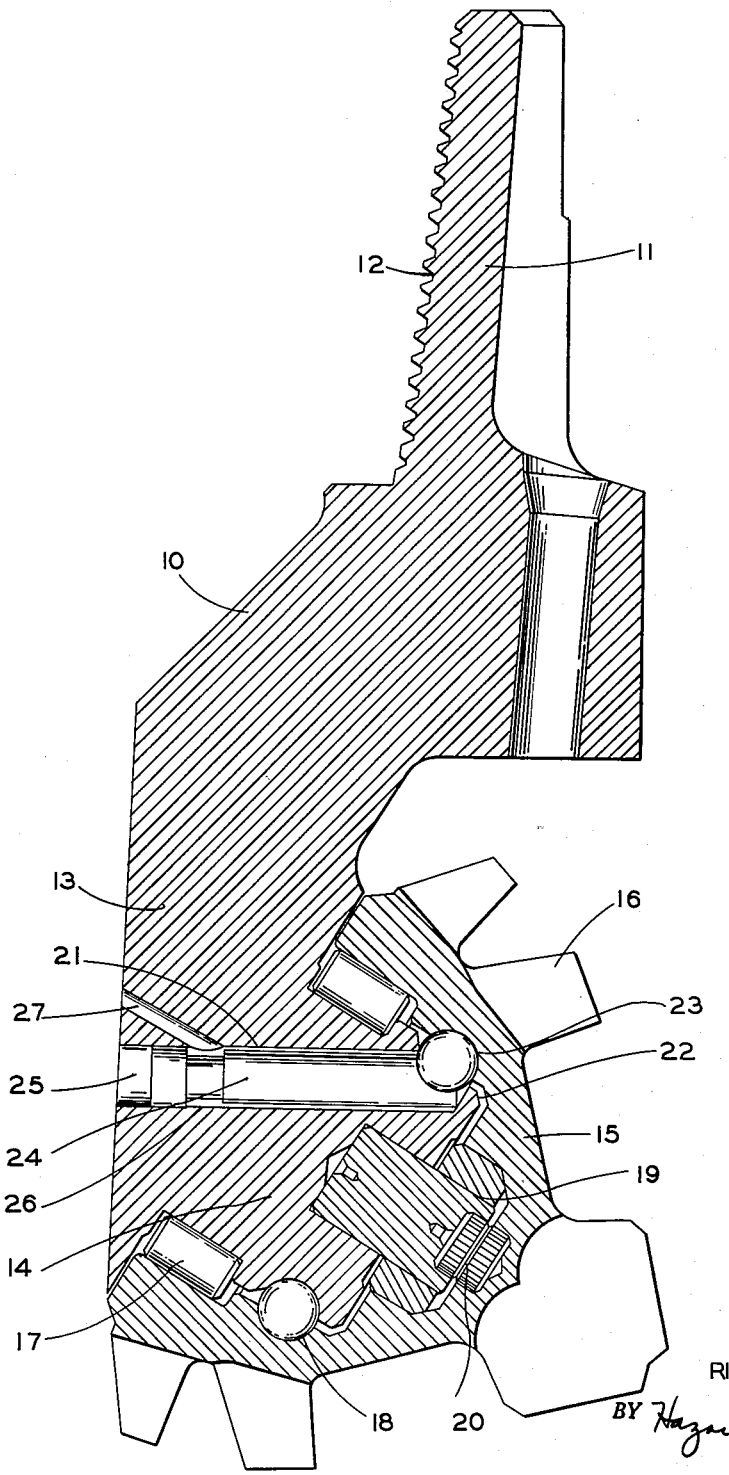
INVENTOR.
RICHARD E. GOETZ
BY Hazard & Miller
ATTORNEY United States Patent Office 3,095,934
Patented July 2, 1963

3,095,934
ROLLER BIT LUBRICATION
Richard E. Goetz, Long Beach, Calif., assignor to Smith Tool Co., Compton, Calif., a corporation of California
Filed Feb. 13, 1961, Ser. No. 88,843
2 Claims. (Cl. 175—227)

This invention relates to improvements in well drilling bits of the roller or rock bit type.

Explanatory of the present invention, it has heretofore been customary to construct 3-cone rock bits by forming the body of the bit of three parts, all of which are duplicates of each other. Each part has a downwardly extending leg on the inner side of which there is a journal. A roller cutter is rotatably mounted on the journal and on completion of the assembly the three parts of the bit body are mutually assembled and usually welded together. If the rock bit is to have four cutters instead of three, the body of the bit may be made of four parts that are ultimately welded or otherwise secured together to form the complete bit body.

In mounting the roller cutter on the journal, the radial bearings are usually of such a design that the cutter can be merely telescoped thereover onto the journal. The thrust bearings are sometimes of the friction type near the small end of the conical cutter but frequently include a ball bearing the balls of which are fed through a hole drilled in the bearing and terminating on the ball race formed on the journal. These balls are fed into a position between their races after the cutter has been telescoped onto the journal and after the ball bearing has been supplied with all of its balls a plug is usually inserted into the hole and welded in place, thus retaining the balls of the ball thrust bearing in place.

Bits of this general character have presented difficult lubrication problems. Although a lubricant such as grease may be copiously wiped onto the journal and on the interior of the cutter, this grease may be detrimentally affected by the high temperatures involved in welding the ball plug in place. Furthermore, there is no assurance that the lubricant completely fills the bearings when the assembly is completed. What is probably most important is that the lubricant does not tend to remain in place in the bearings during use of the bit.

Many bits of this general character which have been used and which have been recovered have been disassembled and on disassembly it has been found that the lubricant has entirely escaped or has been removed from between the bearings. This loss of lubricant is presumably due to a "pumping action" that occurs during usage wherein circulation fluid in the well is alternately drawn into the bearing and expelled. The drawing in of circulation fluid and its expelling from the bearing apparently washes away or carries with it the lubricant very rapidly.

A primary object of the present invention is to provide a construction which in actual practice, causes the lubricant to remain in the bearings between the cutter and the journal thus effectively prolonging the life of the bit.

Another object of the invention is to provide a bit construction having the above-mentioned characteristics and wherein it is possible to be assured that the bearings between the cutter and the journal are completely filled with lubricant prior to the time of use.

With the foregoing and other objects in view, which will be made manifest in the following detailed description and specifically pointed out in the appended claims, reference is had to the accompanying drawings for an illustrative embodiment of the invention, wherein:

The FIGURE is a vertical section through one of the parts used to make up a complete well drilling bit and embodying the present invention.

Referring to the accompanying drawings wherein similar reference characters designate similar parts throughout, the improved bit is made up of a plurality of body parts 10 each of which has an upwardly extending stem portion 11 that can be externally threaded as at 12 for attachment to a drill collar at the lower end of a well drilling string. Each body part has a downwardly extending leg 13 on the inner side of which there is a generally cylindrical journal 14.

A roller type cutter 15 of generally conical form and which may have various designs of teeth 16 thereon is rotatable on the journal. Usually there is a radial roller bearing, the rollers of which are indicated at 17 and which rolls on races formed on the exterior of the journal 14 and the interior of the cutter 15. Usually there is also a ball thrust bearing, the balls of which are indicated at 18.

There may be in addition to the roller radial bearing and the ball thrust bearing a radial friction bearing generally indicated at 19 and a friction thrust bearing 20. Usually these friction bearings are located near the small end of the conical cutter 15 because of space limitations.

In assemblying a cutter 15 with its body part 10 it has heretofore been customary to coat the journal copiously with a lubricant such as grease and to similarly coat the interior of the cutter 15. The rollers 17 of the radial bearing can be applied to the journal and the cutter 15 can then be telescoped onto the journal.

A hole 21 is drilled in the leg 13 and through the journal 14 terminating on the inner race 22 of the ball bearing. This hole is of a size to permit the balls 18 to be consecutively fed therethrough and to occupy the space between the inner race 22 formed on the journal 14 and the outer race 23 formed on the interior of the cutter. After the thrust bearing is completed by the insertion of the balls 18, a ball plug 24 is inserted into the hole 21 and is usually welded in place such as by a weld 25. This ball plug has its inner end shaped to conform to the inner race 22 that is formed on the journal 14.

The above-described construction has heretofore been quite customary. The improvement consists of forming the ball plug 24 with an annular groove 26 and drilling a hole 27 in the leg 13 which communicates with this groove. Inwardly of the groove 26 the ball has a small clearance with the walls of the hole 21 so that grease or lubricant forced under pressure through the hole 27 and into the groove 26 may flow along the sides of the ball plug 24 to the inner race 22 of the ball bearing. This grease is forced into the hole 27 in sufficient quantities so that grease will ultimately be expelled past the roller bearing 17 between the outer end of the roller cutter 15 and the inner face of the leg 13. When the grease is thus adequately expelled there is reasonable assurance that both bearings are completely filled with lubricant. The grease that is supplied through the hole 27 is supplied after the weld 25 has been completed so that this lubricant is not detrimentally affected by the heat involved in the welding. Outwardly of the groove 26 the ball plug 24 may fit the hole 21 with no clearance or only a working clearance.

I find that when a bit is constructed in this manner and the hole 27 is left open that not only is it possible to completely fill the bearings with lubricant but that the lubricant tends to remain in place between the cutter 15 and the journal. The pumping action which normally causes the lubricant to be washed out or dissipated apparently is no longer effective to remove the lubricant. In what manner the open passage formed by the hole 27, the groove 26, and the clearance on the exterior of the ball plug 24 arrests this pumping action, I do not know but many inspections of used bits demonstrate that its presence produces a beneficial effect insofar as the retention of lubricant between the cutter and the journal is concerned. Bits which are otherwise identical but which do not possess this passage quickly lose their lubricant, and on being recovered show that the lubricant is entirely gone between the cutter and the journal. Bits possessing the passage on being recovered and disassembled show substantial quantities of lubricant remaining in place.

It will be appreciated that the nature of this passage leading from the exterior of the leg 13 to the inner race 22 can assume a variety of varying forms. For example, axial grooves may be formed on the exterior of the plug 24 instead of merely employing a clearance. Also, a hole may be formed in the plug 24 itself leading to the inner race 22. At all events it has been my observation that if such a passage is present and is left open-ended at the time of use prolonged bearing life is obtainable.

When a cutter has been thus assembled with its body 10 the requisite number of body portions are assembled together and welded or otherwise secured to form a rigid bit structure.

While the passage has heretofore been referred to as being open it is normally completely filled with lubricant or grease at the time the bit is introduced into a well. The grease therein, however, is freely movable in response to pressure in either direction, and except for the grease filling the passage the passage is left open.

Various changes may be made in the details of construction without departing from the spirit and scope of the invention as defined by the appended claims.

I claim:

1. A well drilling bit comprising a body having a leg on which there is a journal, a roller cutter rotatable on the journal, opposed ball races on the exterior of the journal and on the interior of the cutter, balls between said races, there being a hole in the journal leading from the exterior of the leg to the ball race on the journal through which balls can be fed to between the races, a ball plug closing the outer entrance to the hole and extending inwardly to the race on the journal, there being a groove around the ball plug adjacent its outer end there being a clearance between the ball plug and the walls of the hole, which clearance extends from the groove to the inner end of the ball plug, there being a single hole in the leg leading from the outer side thereof to the groove on the ball plug.

2. A well drilling bit comprising a body having a leg on which there is a journal, a roller cutter rotatable on the journal, ball races on the exterior of the journal and on the interior of the cutter, balls between said races, there being an opening in the journal through which the balls were introduced to between the races, a ball plug closing said opening and retaining the balls between the races, said ball plug having an annular groove thereon intermediate its ends, there being a single, open-ended passage in the leg leading from the outside surface of the leg to the groove, and a clearance between said ball plug and the walls of the opening closed thereby extending from the groove to the ball race on the journal.

References Cited in the file of this patent

UNITED STATES PATENTS

| | | |
|---|---|---|
| 1,136,134 | Hughes | Apr. 20, 1915 |
| 1,305,489 | Patin | June 3, 1919 |
| 2,037,967 | DeCosta | Apr. 21, 1936 |
| 2,620,686 | Peter | Dec. 9, 1952 |
| 2,661,932 | Woods | Dec. 8, 1953 |
| 2,814,464 | Pike et al. | Nov. 26, 1957 |
| 2,831,660 | Smiecinski | Apr. 22, 1958 |
| 2,861,780 | Butler | Nov. 25, 1958 |
| 2,880,970 | Swart | Apr. 7, 1959 |